United States Patent
Lee et al.

(10) Patent No.: US 8,295,211 B2
(45) Date of Patent: Oct. 23, 2012

(54) METHOD FOR CONCURRENTLY TRANSMITTING AND RECEIVING DATA THROUGH HETEROGENEOUS COMMUNICATION NETWORKS AND APPARATUS USING THE SAME

(75) Inventors: Jae-Hoon Lee, Seoul (KR); Ki-Uk Song, Suwon-si (KR); Seong-Taek Hwang, Pyeongtaek-si (KR); Byung-Jik Kim, Seongnam-si (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 507 days.

(21) Appl. No.: 12/269,986

(22) Filed: Nov. 13, 2008

(65) Prior Publication Data
US 2009/0185511 A1 Jul. 23, 2009

(30) Foreign Application Priority Data
Nov. 13, 2007 (KR) .................. 10-2007-0115550

(51) Int. Cl.
*H04J 3/00* (2006.01)

(52) U.S. Cl. ...................................................... 370/280
(58) Field of Classification Search .................. 370/276, 370/310
See application file for complete search history.

(56) References Cited

U.S. PATENT DOCUMENTS

2007/0184798 A1* 8/2007 Bitran et al. .................. 455/132
2008/0080406 A1* 4/2008 Peplinski et al. ............. 370/294

* cited by examiner

*Primary Examiner* — Anh-Vu Ly
*Assistant Examiner* — Maharishi Khirodhar
(74) *Attorney, Agent, or Firm* — Cha & Reiter, LLC

(57) ABSTRACT

A method for transmitting/receiving data in an orthogonal frequency division multiple access-time division duplex (OFDMA-TDD) scheme. A first uplink signal and a first downlink signal of a specific band are periodically transmitted/received within a time-divided section. A second uplink signal and a second downlink signal are periodically transmitted/received, and the second signal is of a band other than the specific band, within the time-divided section, wherein, during a time section in which the first downlink signal is transmitted, the second uplink signal is received.

14 Claims, 5 Drawing Sheets

METHOD FOR CONCURRENTLY TRANSMITTING AND RECEIVING DATA THROUGH HETEROGENEOUS COMMUNICATION NETWORKS AND APPARATUS USING THE SAME

CLAIM OF PRIORITY

This application claims priority from application entitled "Method For Concurrently Transmitting And Receiving Data Through Heterogeneous Communication Networks And Apparatus Using The Same" filed with the Korean Intellectual Property Office on Nov. 13, 2007 and assigned Serial No. 2007-115550, the contents of which are incorporated herein by reference in its entirety.

BACKGROUND OF THE INVENTION

1. Field of the Invention

The present invention relates to a method for concurrently transmitting and receiving data through heterogeneous communication networks. More particularly, the present invention relates to a method for concurrently transmitting and receiving frequencies of mutually different bands within a time-divided section, and transmitting and receiving data through heterogeneous communication networks.

2. Description of the Related Art

Recently, as user's demands and interests for the use of the Internet in mobile environments are increasing, there has been a demand for wireless communication capable of achieving two-way communication using communication terminals, such as portable terminals, notebook computers, personal digital assistants (PDAs), etc., regardless of time and space, that is, regardless of "when" and "where," differently from the conventional data communication service using a wired network. According to such a demand, Wireless Broadband Internet (WiBro) has been developed, and has recently been adopted as a standard for $3^{rd}$ generation mobile communication service.

Mobile terminals can be freely used without temporal and/or spatial limitations, owing to the portability thereof Efforts are being made to equip a mobile terminal with various functions through use of certain characteristics of the mobile terminal. Especially, with the recent increase of demand for ubiquitous networking, a Wireless Personal Area Network (WPAN) communication function, such as a Ultra Wide-Band (UWB), Bluetooth, ZigBee, etc. has been applied to mobile terminals.

FIG. 1 is a view illustrating the exemplary configuration of a system including a terminal which supports protocols such as WiBro and WPAN. The system includes a base station (e.g. RAS) 10 for performing communication based on the WiBro, a coordinator 30 for performing through use of the WPAN, and a mobile terminal 20 including a portable subscriber station (PSS) 21 and a network device (ND) 25. The PPS PSS 21 and the ND 25 included in the mobile terminal 20 function as separate modules, respectively. That is, the PSS 21 performs communication based on the WiBro scheme, and the ND 25 performs communication with the coordinator 30 based on the WPAN communication scheme.

FIG. 2 is a block diagram illustrating the exemplary configuration of each communication device included in the system of FIG. 1. For example, the base station (e.g. RAS) 10 includes a base station controller 110 for controlling the base station, a WiBro medium access controller (MAC) 111 for performing a medium access control based on the WiBro scheme, a band processing unit 113, and a base station RF unit 115 for transmitting/receiving RF signals according to IEEE 802.16. The coordinator 30 includes a WPAN MAC 311 for performing a medium access control based on the WPAN scheme, a band processing unit 313, and a coordinator RF unit 315 for transmitting/receiving RF signals according to the WPAN scheme.

The PSS 21 included in the mobile terminal 20 includes a WiBro MAC 211 for performing a medium access control based on the WiBro scheme, a baseband processing unit 213, and a PSS RF unit 215 for transmitting/receiving carriers of a specific bandwidth to/from the base station RF unit 115 according to IEEE 802.16. Also, the ND 25 included in the mobile terminal 20 includes a WPAN MAC 251 for performing a medium access control based on the WPAN scheme, a band processing unit 253, and a WPAN RF unit 255 for transmitting/receiving carriers of a specific bandwidth to/from the coordinator RF unit 315 according to the WPAN scheme.

In order to perform communication in various communication schemes, which are mutually different, the mobile terminal 20 must include all modules for performing communication functions according to the respective communication schemes. For example, the mobile terminal 20 includes the respective MAC layers and the respective physical (PHY) layers for performing the communication functions of the WiBro scheme and WPAN scheme. That is, as illustrated above, the mobile terminal 20 separately includes a module for performing a function according to each scheme. However, when hardware necessary for each module is separately included, the number of components included in the mobile terminal increases, so that the manufacturing cost and the size of the mobile terminal increase.

SUMMARY OF THE INVENTION

Accordingly, the present invention provides a system and method for enabling modules, which performs communication in mutually different schemes based on an orthogonal frequency division multiple access-time division duplex (OFDMA-TDD) scheme, to share components.

In accordance with an exemplary aspect of the present invention, there is provided a method for transmitting/receiving data in an orthogonal frequency division multiple access-time division duplex (OFDMA-TDD) scheme, the method including the steps of: periodically transmitting/receiving a first uplink signal and a first downlink signal of a specific ban-d within a time-divided section; and periodically transmitting/receiving a second uplink signal and a second downlink signal of a band, other than the specific band, within the time-divided section, wherein, during a time section in which the first downlink signal is transmitted, the second uplink signal is received. Here, the periodic transmission/reception time frame complies with a Mobile Wimax standard or Wibro based on IEEE 802.16.

During a time section in which the first uplink signal is received, the second downlink signal may be transmitted. The band in which the first uplink signal and the first downlink signal are transmitted/received may be a band assigned to perform Wireless Broadband Internet (WiBro) communication, and the band in which the second uplink signal and the second downlink signal are transmitted/received may be a band assigned to perform communication using a Wireless Personal Area Network (WPAN).

In accordance with another exemplary aspect of the present invention, there is provided an apparatus for transmitting/receiving data in an orthogonal frequency division multiple access-time division duplex (OFDMA-TDD) scheme, the apparatus may include: a first medium access controller (MAC) for generating a first downlink signal of a specific band based on a specific protocol, receiving a first uplink signal input from an exterior, and for performing a medium access control on the first uplink signal; a second MAC for generating a second downlink signal based on a protocol and a band, which are different those used by the first MAC, for receiving a second uplink signal input from an exterior, and for performing a medium access control on the second uplink signal; a band processing unit for controlling transmission/reception timing of signals so that the first downlink signal generated by the first MAC is transmitted, and simultaneously, the second uplink signal input to the second MAC is received; and a transmission/reception front-end unit for transmitting/receiving the first uplink signal, the first downlink signal, the second uplink signal, and the second downlink signal based on a control signal of the band processing unit.

Preferably, according to an exemplary aspect of the present invention, the band processing unit controls the second downlink signal generated by the second MAC to be transmitted, and simultaneously controls the second uplink signal input to the first MAC to be received.

The first MAC may perform a medium access control based on a Wireless Broadband Internet (WiBro) protocol, and the second MAC may perform a medium access control according to a communication scheme based on a Wireless Personal Area Network (WPAN).

The transmission/reception front-end unit may include: at least one antenna; a duplexer positioned between the band processing unit and the antenna, the duplexer dividing an uplink signal and a downlink signal, which are simultaneously transmitted/received, from each other based on a frequency division duplexing scheme; a first amplifier for amplifying and outputting an uplink signal input from the duplexer; and a second amplifier for amplifying and outputting a downlink signal input from the band processing unit.

Preferably, in an exemplary aspect of the invention, the apparatus further include a 2×2 switch positioned between the duplexer and the first and second amplifiers.

Preferably, the 2×2 switch can selectively connect the first and second amplifiers to the duplexer either so as to transfer a downlink signal from the first amplifier to the duplexer and simultaneously transfer an uplink signal from the duplexer to the second amplifier, or so as to transfer a downlink signal from the second amplifier to the duplexer and simultaneously transfer an uplink signal from the duplexer to the first amplifier.

The apparatus may further include, for example, first and second bandpass filters positioned on connection lines, respectively, between the duplexer and the 2×2 switch.

The first bandpass filter may pass signals in a band which is assigned to perform Wireless Broadband Internet (WiBro) communication, and the second bandpass filter may pass signals in a band which is assigned to perform data communication using a Wireless Personal Area Network (WPAN).

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, an exemplary embodiment of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention without departing from the spirit of scope of the appended claims.

The present invention relates to a method for enabling at least two modules, which operate in mutually different communication schemes based on orthogonal frequency division multiple access-time division duplex (OFDMA-TDD), to individually transmit/receive data. According to an exemplary aspect of the present invention, the different communication schemes can use different frequency bands, and there is provided a method for transferring a downlink signal by one communication scheme and simultaneously transferring an uplink signal by the other communication scheme, and an exemplary apparatus to which the method is applied.

An exemplary embodiment of the present invention will be described in conjunction with a Wireless Broadband Internet (WiBro) scheme and a Wireless Personal Area Network (WPAN) scheme as mutually different communication schemes, wherein the WiBro scheme and the WPAN scheme are set to use mutually different frequency bands. Although the exemplary embodiment of the present invention is described with the WiBro scheme and the WPAN scheme as being mutually different communication schemes, the present invention is not limited thereto, and the mutually different communication schemes have only to be communication schemes to which the OFDMA-TDD can be applied.

Figure 1:
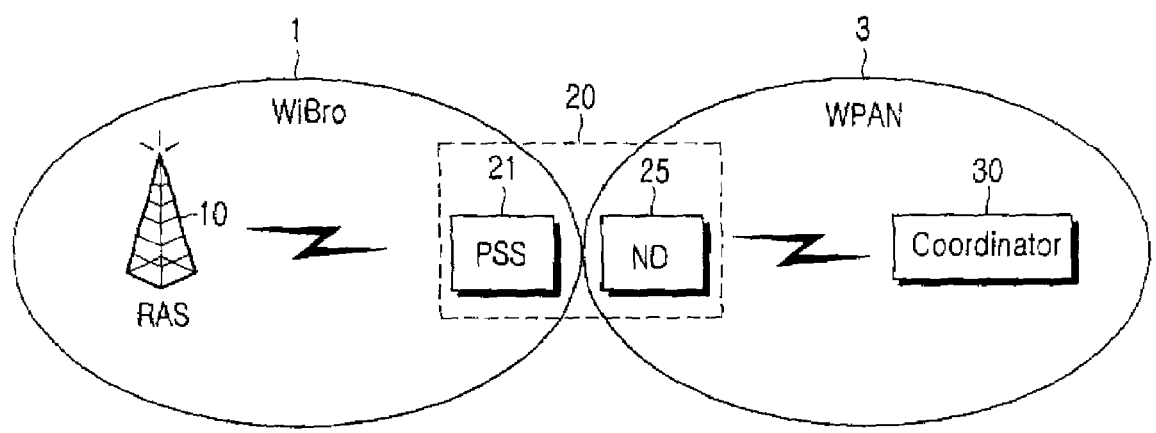
FIG. 1 is a view illustrating a conventional configuration of a system including a terminal which supports Wireless Broadband Internet (WiBro) and a Wireless Personal Area Network (WPAN)
Figure 2:
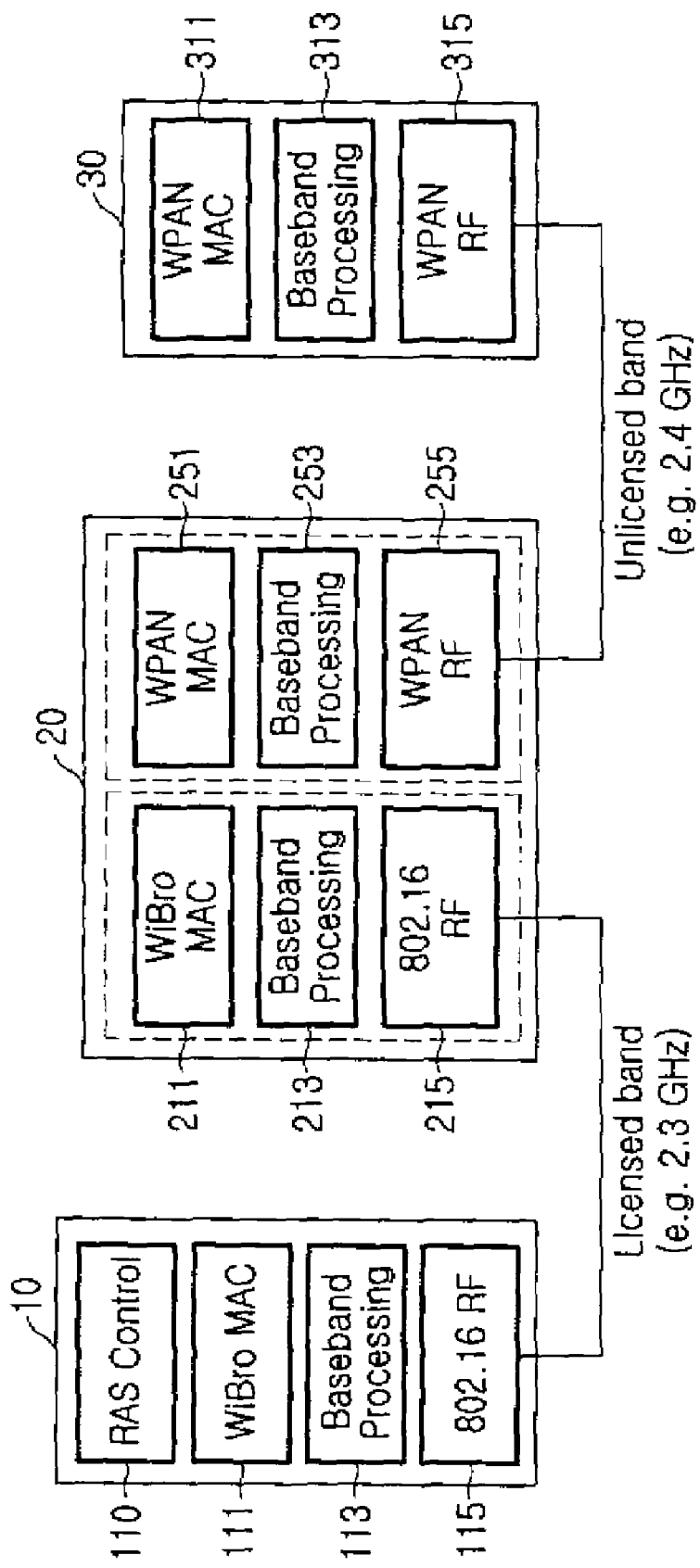
FIG. 2 is a block diagram illustrating the conventional configuration of each communication device included in the system of FIG. 1.
Figure 3:
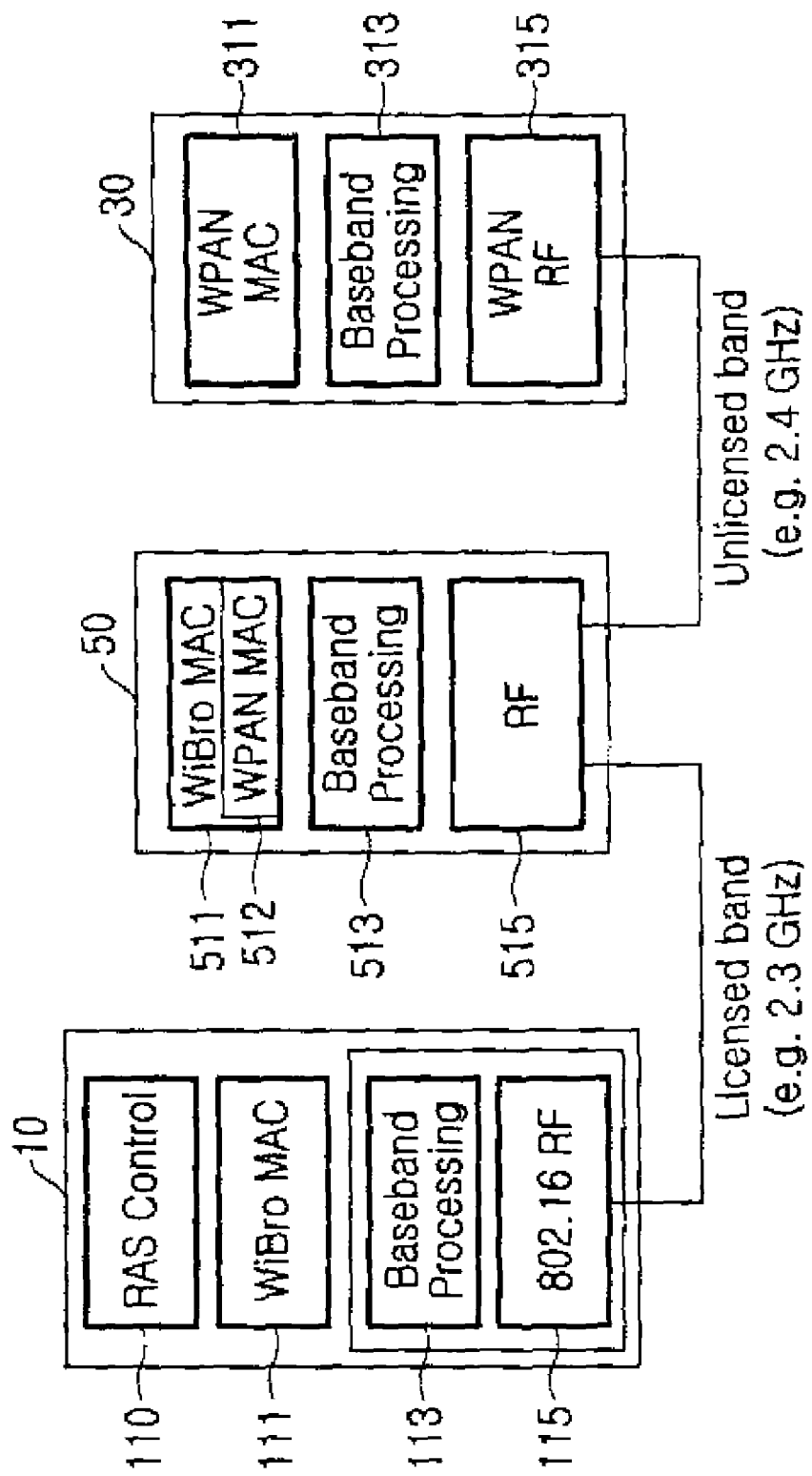
FIG. 3 is a block diagram illustrating the exemplary configuration of a base station and a WPAN coordinator in a communication system which includes a mobile terminal according to an exemplary embodiment of the present invention.

FIG. 3 is a block diagram illustrating one possible configuration of a base station 10 and a WPAN coordinator 30 in a communication system which includes a mobile terminal 50 according to an exemplary embodiment of the present invention. The base station 10 includes a base station controller 110, a WiBro medium access controller (MAC) 111 for performing a medium access control based on the WiBro scheme, a baseband processing unit 113, and an 802.16 RF unit 115 for transmitting/receiving a frequency of a specific band based on IEEE 802.16. The WPAN coordinator 30 includes a WPAN MAC 311 for performing a medium access control based on the WPAN scheme, a band processing unit 313, and a WPAN RF unit 315 for transmitting/receiving a frequency of a specific band based on the WPAN scheme.

Meanwhile, a data communication device, including but in no way limited to a mobile terminal 50, according to an exemplary embodiment of the present invention, may includes a WiBro MAC 511, a WPAN MAC 512, a band processing unit 513, and an RF unit 515.

The WiBro MAC 511 assigns a specific frequency bandwidth to transmit/receive data according to the WiBro scheme, and establishes and manages a connection with the base station 10.

Still referring to FIG. 3, the WPAN MAC 512 assigns a specific frequency bandwidth to transmit/receive data according to a communication scheme using the WPAN, and establishes and manages a connection with the coordinator 30. Here, a frequency band which the WPAN MAC 512 assigns to transmit/receive data according to the WPAN scheme is set to differ from that assigned by the WiBro MAC 511.

In addition, the WiBro MAC 511 and the WPAN MAC 512 frame data to be transmitted according to the respective exemplary schemes (i.e. WiBro scheme and WPAN scheme in this particular example), schedule data according to the sizes of frames, and separate data from frames which have been received from an exterior. Also, in order to protect data to be transmitted, the WiBro MAC 511 and the WPAN MAC 512 perform a function of performing encryption/decryption of a data packet included in a frame, performing a CRC operation on the encrypted packet, and inserting a resultant CRC value into the frame.

Figure 4:
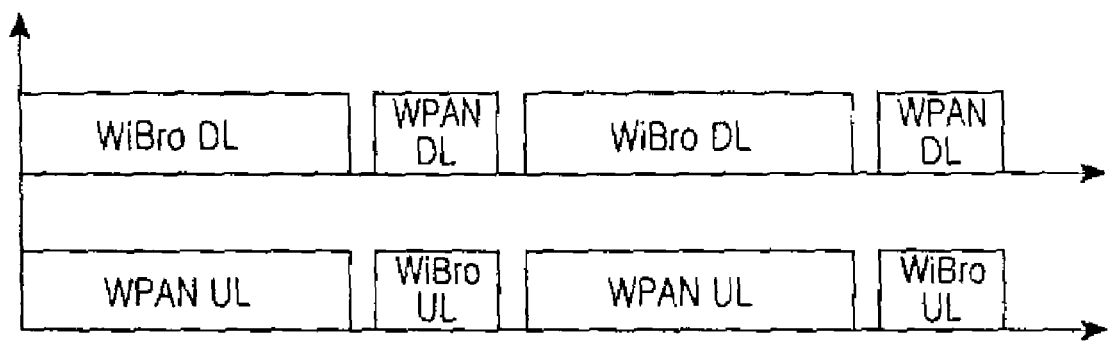
FIG. 4 is a timing view illustrating a transmission/reception section controlled by a band processing unit according to an exemplary embodiment of the present invention.

The baseband processing unit 513 outputs an ON/OFF control signal in a predetermined period according to signal transmission/reception sections. FIG. 4 is a timing view illustrating a transmission/reception section controlled by the band processing unit 513 according to an exemplary embodiment of the present invention. As shown in FIG. 4, the band processing unit 513 assigns a downlink signal transmission section and an uplink signal reception section according to each communication scheme, and outputs control signals according to the assigned transmission sections. In this particular case, the baseband processing unit 513 sets a section "WiBro DL" for transmitting a downlink signal by the WiBro scheme, and a section "WPAN UL" for receiving an uplink signal by the WPAN scheme to be the same. In addition, the band processing unit 513 sets a section "WiBro UL" for receiving an uplink signal by the WiBro scheme, and a section "WPAN DL" for transmitting a downlink signal by the WPAN scheme to be the same.

Continuing to refer to FIG. 3, The RF unit 515 transmits downlink signals, which are received from the WiBro MAC 511 and the WPAN MAC 512, through frequency bands established according to the respective communication schemes (i.e. the WiBro scheme and the WPAN scheme, respectively). Also, the RF unit 515 transfers uplink signals, received in the above bands, to the WiBro MAC 511 and the WPAN MAC 512. In addition, the RF unit 515 is controlled by a control signal received from the band processing unit 513, wherein the RF unit 515 transmits a WiBro downlink signal, received from the WiBro MAC 511, through a radio channel of a WiBro band, and simultaneously transfers a WPAN uplink signal, received through a radio channel of a WPAN band, to the WPAN MAC 512. In addition, the RF unit 515 transfers a WiBro uplink signal, received through the radio channel of the WiBro band, to the WiBro MAC 511, and simultaneously transmits a WPAN downlink signal, received from the WPAN MAC 512, through the radio channel of the WPAN band.

Figure 5:
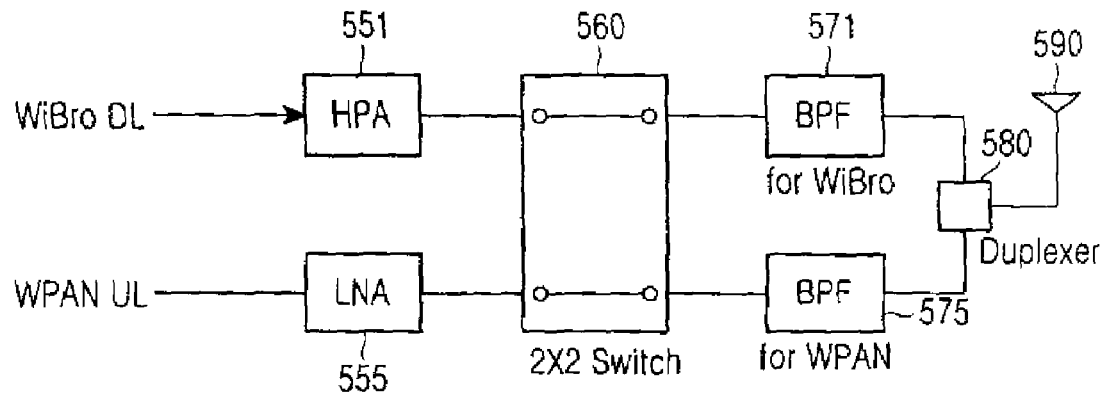
FIG. 5 is a block diagram showing an example of an RF unit included in the mobile terminal according to an exemplary embodiment of the present invention.
Figure 6:
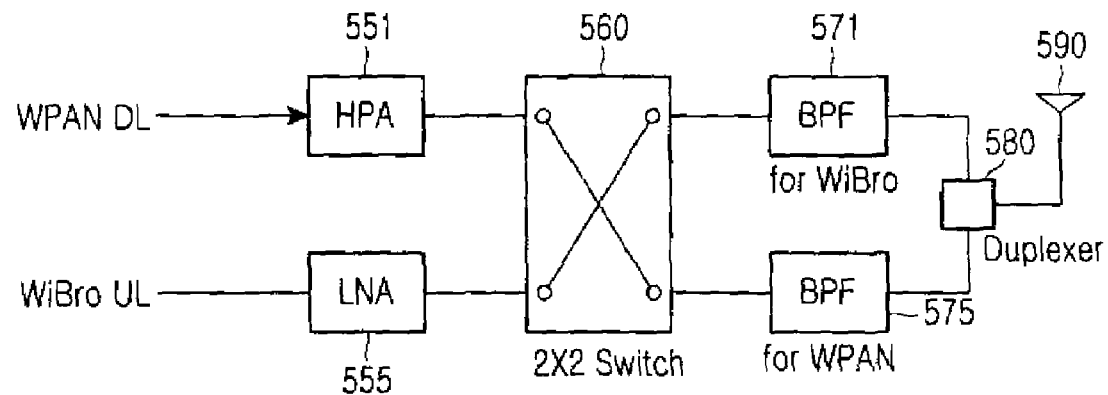
FIG. 6 is a block diagram showing another example of the RF unit included in the mobile terminal according to another exemplary embodiment of the present invention.

FIGS. 5 and 6 are block diagrams illustrating the RF unit included in the mobile terminal according to an exemplary embodiment of the present invention. The RF unit 515 according this particular example of the present invention includes a high power amplifier (HPA) 551, a low noise amplifier (LNA) 555, a duplexer 580, and an antenna 590.

The HPA 551 periodically receives a WiBro downlink signal and a WPAN downlink signal from the WiBro MAC 511 and the WPAN MAC 512, and amplifies power of the received signals so that the received signal can have enough power at the final stage. The operation of the HPA 551 is controlled by a TDD scheme-based ON/OFF signal received from the band processing unit 513.

The LNA 555 amplifies, for example, a WiBro uplink signal and a WPAN uplink signal, which are received through the antenna and include noise on a radio channel, so as to restrain the noise from being amplified, and to extract only valid baseband signals.

The duplexer 580 transfers a WPAN-band uplink signal received through the antenna 590 to the LNA 555 during a section in which the duplexer 590 transmits a WiBro-band downlink signal to the antenna 590, and transfers a WiBro-band uplink signal received through the antenna 590 to the LNA 555 during a section in which the duplexer 590 transmits a WPAN-band downlink signal to the antenna 590. In addition, the operation timing of the duplexer 580 is controlled, for example, by a time division control signal output from the band processing unit 513.

Still referring to FIGS. 5 and 6, preferably, the RF unit 515 according to this example of the present invention further includes a 2×2 switch 560 for transferring WiBro-band uplink and downlink signals, and WPAN-band uplink and downlink signals according to transmission/reception timing. The 2×2 switch 560 is controlled by the band processing unit 513, and performs a function of selectively connecting the duplexer 580, the HPA 551, and the LNA 555. In detail, referring to FIG. 5, while a downlink signal by the WiBro scheme is transmitted and an uplink signal by the WPAN scheme is received, the 2×2 switch 560 is positioned to transfer the downlink signal, received through the HPA 551 from the WiBro MAC 511, to the duplexer 580, and simultaneously to transfer the uplink signal from the duplexer 580 to the LNA 555.

Also, referring to FIG. 6, while a downlink signal by the WPAN scheme is transmitted and an uplink signal by the WiBro scheme is received, the 2×2 switch 560 is positioned to transfer the downlink signal, received through the HPA 551 from the WPAN MAC 311, to the duplexer 580, and simultaneously to transfer the uplink signal from the duplexer 580 to the LNA 555.

In addition, according to another exemplary embodiment of the present invention, the RF unit 515 may further include a WiBro bandpass filter 571 and a WPAN bandpass filter 575. The WiBro bandpass filter 571 performs a filtering operation so as to remove noise, except for WiBro band signals, from downlink signals amplified through the HPA 551, and to accurately receive signals in the WiBro band from among uplink signals received through the antenna. The WPAN bandpass filter 575 performs a filtering operation on downlink signals and uplink signals in the WPAN band, similarly to the WiBro bandpass filter 571.

Preferably, the WiBro bandpass filter 571 and the WPAN bandpass filter 575 may be connected between the 2×2 switch 560 and the duplexer 580.

Hereinafter, a method for transmitting/receiving data according to an exemplary embodiment of the present invention will be described with the components of the system.

For example, when the user requests the mobile terminal 50 to access the WiBro network through use of an interface implemented in the mobile terminal 50, the WiBro MAC 511 in the mobile terminal 50 assigns a specific frequency bandwidth to transmit/receive data, and establishes parameters required for a connection with the base station 10. The mobile terminal 50 transmits the established parameters through the band processing unit 513 and the RF unit 515 to the base station 10, through use of the assigned frequency bandwidth during a predetermined section. Then, the base station 10 connects the mobile terminal 50 to the WiBro network based on the WiBro scheme, and the mobile terminal 50 and the base station 10 transmit/receive data to/from each other.

In the exemplary procedure of transmitting/receiving data, the band processing unit 513 of the mobile terminal 50 periodically establishes a WiBro downlink signal transmission section and a WiBro uplink signal reception section, and outputs a control signal corresponding to the established sections to the RF unit 515. The output control signal is transferred to the 2×2 switch 560 and the duplexer 580. Accordingly, the 2×2 switch 560 selectively connects the WiBro bandpass filter 571 with either the HPA 551 or the LNA 555. A section in which the HPA 551 and the WiBro bandpass filter 571 are connected to each other corresponds to a section in which the mobile terminal 50 transmits a downlink signal. The duplexer 580 transmits a WiBro downlink signal, which is received from the WiBro MAC 511 during the downlink signal transmission section, through the antenna 590 to the base station 10.

In contrast, a section in which the LNA 555 and the WiBro bandpass filter 571 are connected to each other corresponds to a section in which the mobile terminal 50 receives an uplink signal. The duplexer 580, for example, transmits an uplink signal, which is received from the base station 10 during the uplink signal reception section, to the WiBro MAC 511 through the WiBro bandpass filter 571 and the LNA 555.

Meanwhile, when the user sets the mobile terminal 50 to enter a state of waiting for access to the WPAN while the mobile terminal 50 accesses the WiBro network and is transmitting/receiving data, the band processing unit 513 of the mobile terminal 50 sets a WiBro downlink signal transmission section to a WPAN uplink signal reception section, and sets a WiBro uplink signal reception section to a WPAN downlink signal transmission section. Then, the band processing unit 513 generates and transfers a control signal, corresponding to the setting, to the 2×2 switch 560 and the duplexer 580 of the RF unit 515.

Accordingly, the 2×2 switch 560 connects the WPAN bandpass filter 575 and the LNA 555 to each other during a section in which the HPA 551 and the WiBro bandpass filter 571 are connected to each other, and connects the WiBro bandpass filter 571 and the LNA 555 to each other during a section in which the HPA 551 and the WPAN bandpass filter 575 are connected to each other, so that the mobile terminal 50 enters the state of waiting for data communication according to the WPAN scheme.

Also, the duplexer 580 extracts uplink signals in the WPAN band while downlink signals in the WiBro band are being transmitted, and similarly extracts uplink signals in the WiBro band while downlink signals in the WPAN band are being transmitted.

While the mobile terminal 50 is in the state of waiting for data communication according to the WPAN scheme, as described above, when the WPAN coordinator 30 requests a WPAN access of the mobile terminal 50, a WPAN access request signal is extracted as an uplink signal in the WPAN band during a section in which the mobile terminal 50 receives uplink signals in the WPAN band, and is then transferred to the WPAN MAC 512 through the WPAN bandpass filter 575, the 2×2 switch 560, and the LNA 555.

Next, the WPAN MAC 512 assigns a specific frequency band to transmit/receive data, establishes parameters required for a connection with the WPAN coordinator 30, and creates a connection with the WPAN coordinator 30.

When a connection between the mobile terminal 50 and the WPAN coordinator 30 has been established, the WPAN MAC 512 frames data to be transmitted, schedule data according to the sizes of frames, and separate data from frames which have been received from an exterior. Also, in order to protect data to be transmitted, the WiBro MAC 511 and the WPAN MAC 512 perform a function of performing encryption/decryption of a data packet included in a frame, performing a CRC operation on the encrypted packet, and inserting a resultant CRC value into the frame.

In addition, during a section in which the duplexer 580 receives a downlink signal in the WiBro band through the WiBro MAC 511, the HPA 551, the 2×2 switch 560, and the WiBro bandpass filter 571, and transmits the received downlink signal in the WiBro band through the antenna 590, the duplexer 580 transfers an uplink signal in the WPAN band, which is received through the antenna 590, to the WPAN MAC 512 through the WPAN bandpass filter 575, the 2×2 switch 560, and the LNA 555. Similarly, during a section in which the duplexer 580 transmits a downlink signal in the WPAN band, received from the WPAN MAC 512, through the antenna 590, the duplexer 580 transfers an uplink signal in the WiBro band, which is received through the antenna 590, to the WiBro MAC 511. The aforementioned procedure is repeatedly performed to perform data communication based on the WiBro scheme and the WPAN scheme.

According to the present invention, as described in the above example, when one mobile terminal operates in heterogeneous communication schemes, a downlink signal according to one communication scheme can be transferred and simultaneously an uplink signal according to any other communication scheme can be transferred by transmitting uplink and downlink signals according to the schemes in a time division scheme through use of mutually different frequency bands.

Accordingly, it is possible to share hardware required in common for operating in heterogeneous communication schemes.

In addition, since an uplink signal and a downlink signal, which are in mutually different frequency bands, can be transferred at the same time, so that the data transmission efficiency can be increased.

While the present invention has been shown and described with reference to certain exemplary embodiments thereof, the present invention is not limited thereto, and it will be understood by those skilled in the art that various changes in form and details may be made therein. For example, while a 2×2 switch is shown and described in the specification and drawings, other types of switches with different configurations can be used. Simultaneous transmission and reception may partially overlap, but is preferably within the same time-divided section.

What is claimed is:

1. A method for transmitting/receiving data in an orthogonal frequency division multiple access-time division duplex (OFDMA-TDD) scheme, the method comprising the steps of:
   (a) periodically transmitting a first uplink signal and receiving a first downlink signal of a specific band within a repeating time-divided section of the OFDMA-TDD scheme by a transmission/reception front-end unit; and (b) periodically transmitting a second uplink signal and receiving a second downlink signal of a band, other than said specific band in step (a), within the repeating time-divided section of the OFDMA-TDD scheme by said transmission/reception front-end unit, wherein, the second uplink signal of said band other than said specific band is received by a transmission/reception front-end unit during a same particular time section in which the first downlink signal is transmitted;

dividing an uplink signal and a downlink signal from each other, which are simultaneously transmitted/received, by a duplexer positioned between the band processing unit and the antenna based on a frequency division duplexing scheme;

respectively connecting a first protocol and a second protocol to the duplexer via one of a first bandpass filter and a second bandpass filter by a 2×2 switch;

arranging a high power amplifier (HPA) coupled to a first node of the 2×2 switch for amplifying downlink signals from the first protocol and the different protocol;

arranging a low noise amplifier (LNA) coupled to a second node of the 2×2 switch for amplifying uplink signals from the first protocol and the second protocol;

wherein a multi-protocol baseband processing unit controlling transmission/reception timing of signals for transmitting and receiving the first uplink signal and first downlink signal, and for transmitting and receiving the second uplink signal and the second downlink signal; and wherein a protocol of transmission/reception of both the specific band and the band other than the specific band are different from each other, and the multi-protocol baseband processing unit process signals of both bands and both protocols.

2. The method as claimed in claim 1, wherein, during the same particular time section in which the first uplink signal is received, the second downlink signal is transmitted.

3. The method as claimed in claim 1, wherein the specific band in step (a) in which the first uplink signal and the first downlink signal are transmitted/received corresponds to a band assigned to perform Wireless Broadband Internet (WiBro) communication.

4. The method as claimed in claim 1, wherein the specific band in step (a) in which the first uplink signal and the first downlink signal are transmitted/received corresponds to a band assigned to perform communication using a Wireless Personal Area Network (WPAN).

5. An apparatus for transmitting/receiving data in an orthogonal frequency division multiple access-time division duplex (OFDMA-TDD) scheme, the apparatus comprising:

a first medium access controller (MAC) for generating a first downlink signal of a specific first band based on a specific protocol, receiving a first uplink signal input from an exterior, and performing a medium access control on the first uplink signal;

a second MAC for generating a second downlink signal based on a protocol and a second band, which are different those used by the first MAC, and for receiving a second uplink signal input from an exterior, and for performing a medium access control on the second uplink signal;

a multi-protocol band processing unit that processes signals based on the specific first band and specific first protocol of the first MAC and the different band and different protocol of the second MAC, said multi-protocol band processing unit controlling transmission/reception timing of signals for transmitting the first downlink signal generated by the first MAC and receiving the second uplink signal input to the second MAC simultaneously;

a transmission/reception front-end unit for transmitting/receiving the first uplink signal, the first downlink signal, the second uplink signal, and the second downlink signal based on a control signal of the band processing unit;

a duplexer positioned between the band processing unit and the antenna the duplexer dividing an uplink signal and a downlink signal from each other, which are simultaneously transmitted/received based on a frequency division duplexing scheme;

a 2×2 switch for respectively connecting the first protocol and the different protocol to the duplexer via one of a first bandpass filter and a second bandpass filter;

a high power amplifier (HPA) coupled to first node of the 2×2 switch for amplifying downlink signals from the first protocol and the different protocol; and a low noise amplifier (LNA) coupled to a second node of the 2×2 switch for amplifying uplink signals from the first protocol and the different protocol.

6. The apparatus as claimed in claim 5, wherein the band processing unit controls the second downlink signal generated by the second MAC to be transmitted, and simultaneously controls the second uplink signal input to the first MAC to be received.

7. The apparatus as claimed in claim 5, wherein the first MAC performs a medium access control based on a Wireless Broadband Internet (WiBro) protocol.

8. The apparatus as claimed in claim 5, wherein the second MAC performs a medium access control according to a communication scheme based on a Wireless Personal Area Network (WPAN).

9. The apparatus as claimed in claim 5, wherein the transmission/reception front-end unit comprises:
at least one antenna;
a first amplifier for amplifying and outputting an uplink signal input from the duplexer; and
a second amplifier for amplifying and outputting a downlink signal input from the band processing unit.

10. The apparatus as claimed in claim 9, further comprising the 2×2 switch is positioned between the duplexer and the first and second amplifiers.

11. The apparatus as claimed in claim 10, wherein the switch selectively connects the first and second amplifiers to the duplexer either for transferring a downlink signal from the first amplifier to the duplexer and simultaneously transfer an uplink signal from the duplexer to the second amplifier, or for transferring a downlink signal from the second amplifier to the duplexer and simultaneously transfer an uplink signal from the duplexer to the first amplifier.

12. The apparatus as claimed in claim 10, wherein the first and second bandpass filters are positioned on connection lines, respectively, between the duplexer and the switch.

13. The apparatus as claimed in claim 12, wherein the first bandpass filter passes signals in a hand which is assigned to perform Wireless Broadband Internet (WiBro) communication.

14. The apparatus as claimed in claim 12, wherein the second bandpass filter passes signals in a band which is assigned to perform data communication using a Wireless Personal Area Network (WPAN).

* * * * *

UNITED STATES PATENT AND TRADEMARK OFFICE
CERTIFICATE OF CORRECTION

PATENT NO. : 8,295,211 B2
APPLICATION NO. : 12/269986
DATED : October 23, 2012
INVENTOR(S) : Jae-Hoon Lee et al.

It is certified that error appears in the above-identified patent and that said Letters Patent is hereby corrected as shown below:

In the Claims:

Column 10, Line 58 should read as follows:
--...passes signals in a band which is...--

Signed and Sealed this
Twenty-third Day of April, 2013

Teresa Stanek Rea
*Acting Director of the United States Patent and Trademark Office*